United States Patent
Drahm et al.

(10) Patent No.: US 8,359,933 B2
(45) Date of Patent: Jan. 29, 2013

(54) MEASURING SYSTEM WITH A TUBE ARRANGEMENT HAVING TWO MEASURING TUBES FLOWED THROUGH IN PARALLEL, AS WELL AS METHOD FOR MONITORING THE ARRANGEMENT

(75) Inventors: Wolfgang Drahm, Erding (DE); Christof Huber, Bern (CH); Vivek Kumar, Muttenz (CH); Alfred Rieder, Landshut (DE); Hao Zhu, Freising (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 142 days.

(21) Appl. No.: 12/926,396

(22) Filed: Nov. 16, 2010

(65) Prior Publication Data
US 2011/0113896 A1    May 19, 2011

Related U.S. Application Data

(60) Provisional application No. 61/272,907, filed on Nov. 18, 2009.

(30) Foreign Application Priority Data

Nov. 18, 2009  (DE) .................. 10 2009 046 839

(51) Int. Cl.
*G01F 1/84* (2006.01)
(52) U.S. Cl. ................................ 73/861.357
(58) Field of Classification Search ............ 73/861.355–861.357
See application file for complete search history.

(56) References Cited

U.S. PATENT DOCUMENTS

| | | | |
|---|---|---|---|
| 5,602,346 A | 2/1997 | Kitami et al. | |
| 5,796,012 A * | 8/1998 | Gomi et al. | 73/861.357 |
| 7,421,350 B2 | 9/2008 | Duffill et al. | |
| 7,895,905 B2 * | 3/2011 | Lammerink et al. | 73/861.355 |
| 2009/0308177 A1 * | 12/2009 | Lammerink et al. | 73/861.355 |

FOREIGN PATENT DOCUMENTS

| | | |
|---|---|---|
| DE | 88 17 220 | 9/1994 |
| DE | 10 2005 050 898 | 5/2007 |
| EP | 0261435 A2 | 3/1988 |
| JP | 11264635 A | 9/1999 |
| WO | WO 2009/051588 | 4/2009 |

OTHER PUBLICATIONS

German Search Report corresponding to Application No. 10 2009 046 839.0, May 25, 2010.

* cited by examiner

*Primary Examiner* — Jewel V Thompson
(74) *Attorney, Agent, or Firm* — Bacon & Thomas, PLLC

(57) ABSTRACT

For monitoring the tube arrangement, the measuring system of the invention includes, connected to the transmitter electronics, a temperature measuring arrangement having a first temperature sensor for producing a temperature signal dependent on a temperature of a first of the measuring tubes of the tube arrangement and at least a second temperature sensor for producing a temperature signal dependent on a temperature of a second of the measuring tubes of the tube arrangement. In the method of the invention, it is provided that, in the case of medium flowing through the tube arrangement, a temperature difference existing between the at least two measuring tubes as a result plugging is ascertained and, in case the ascertained temperature difference deviates from a predetermined limit value for the temperature difference representing a non-plugged tube arrangement, a partial plugging of the tube arrangement, especially a plugging of exactly one of the measuring tubes, is signaled.

31 Claims, 4 Drawing Sheets

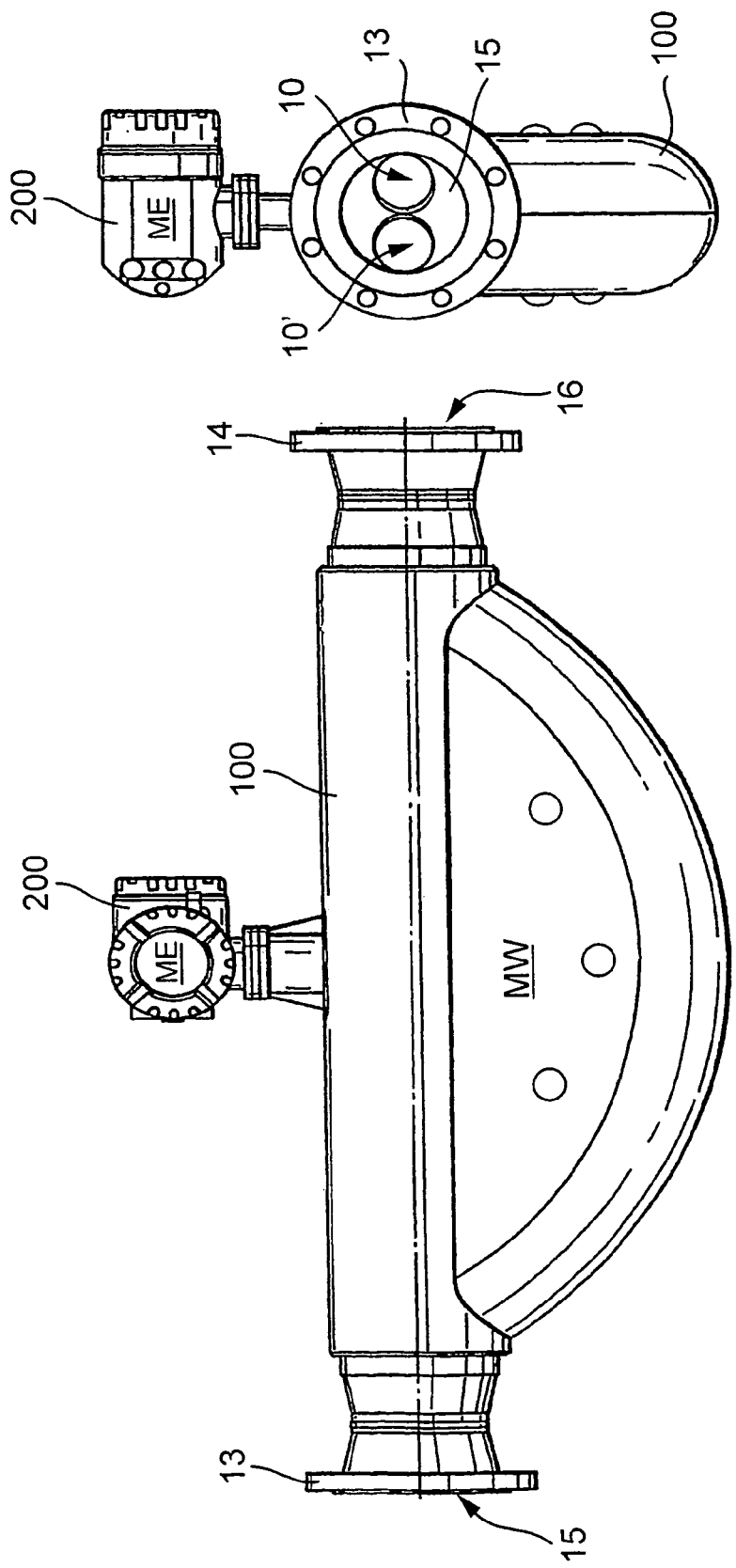

MEASURING SYSTEM WITH A TUBE ARRANGEMENT HAVING TWO MEASURING TUBES FLOWED THROUGH IN PARALLEL, AS WELL AS METHOD FOR MONITORING THE ARRANGEMENT

CROSS-REFERENCE TO RELATED APPLICATION

This application is a Nonprovisional which claims the benefit of U.S. Provisional Application No. 61/272,907 filed on Nov. 18, 2009.

TECHNICAL FIELD

The invention relates to a method for monitoring a tube arrangement formed by means of at least two measuring tubes connected for parallel flow. Moreover, the invention relates to a flowable (especially fluid) media, measuring system suitable for implementing the method, especially embodied as a compact measuring device and/or a Coriolis mass flow measuring device comprising a measuring transducer, which, during operation, is at least at times flowed through by the medium, and which generates measurement signals influenced by at least one measured variable characterizing the flowing medium, especially a mass flow, a density, a viscosity etc.; as well as transmitter electronics electrically coupled with the measuring transducer for processing measurement signals delivered by the measuring transducer into measured values.

BACKGROUND DISCUSSION

In industrial measurements technology—especially in connection with the control and monitoring of automated manufacturing processes—for ascertaining characteristic measured variables of flowing media (for example, liquids and/or gases) in a process line (for example, a pipeline), such measuring systems are often used, which, by means of a measuring transducer of vibration-type, and by means of transmitter electronics connected thereto and most often accommodated in a separate electronics housing, induce in the flowing medium reaction forces (for example, Coriolis forces) and, derived from these, recurrently produce measuring values correspondingly representing the at least one measured variable, for example, a mass flow rate, a density, a viscosity or another process parameter. Such measuring systems—often formed by means of an in-line measuring device of compact construction with integrated measuring transducer, such as, for instance, a Coriolis-mass flow meter—are long known and have proved themselves in industrial use. Examples of such measuring systems with a measuring transducer of vibration type or also individual components thereof, are, for example, described in U.S. Pat. Nos. 4,680,974, 4,738,144, 4,768,384, 4,801,897, 4,823,614, 4,879,911, 5,009,109, 5,050,439, 5,359,881, 5,602,345, 5,734,112, 5,796,011, 5,926,096, 5,969,264, 7,127,952, 6,092,429, 6,311,136, 6,883,387, 7,325,461, 7,392,709, 7,421,350, WO-A 96/08697 or WO-A 2007/040468. The measuring transducers shown therein include, accommodated in a measuring transducer housing, at least two essentially straight or curved (e.g. U- or V-shaped) measuring tubes for conveying the (in given cases, also inhomogeneous, extremely hot or also very viscous) medium, wherein the at least two measuring tubes, forming a tube arrangement with flow paths connected in parallel to one another, are integrated into the process line via an inlet-side flow divider extending between the measuring tubes and an inlet-side connecting flange, as well as via an outlet-side flow divider extending between the measuring tubes and an outlet-side connecting flange. In measuring operation, the then parallelly flowed-through measuring tubes are caused to vibrate for the purpose of generating oscillation forms influenced by the medium flowing through.

In the case of measuring transducers with curved measuring tubes, usually selected as the excited oscillation form—the so-called wanted mode—is that eigenoscillation form, in the case of which each of the measuring tubes at least partially moves in a pendulum-like manner at a lowest natural resonance frequency about an imaginary longitudinal axis of the measuring transducer in the manner of cantilever clamped at one end, whereby Coriolis forces dependent on the mass flow are induced in the medium flowing through. These Coriolis forces, in turn, have the effect that, superimposed upon the excited oscillations of the wanted mode, in the case of curved measuring tubes, thus pendulum-like cantilever oscillations, are bending oscillations of a frequency equal therewith according to at least one likewise natural, second oscillation form, the so-called Coriolis mode. In the case of measuring transducers with curved measuring tubes, these cantilever oscillations in the Coriolis mode compelled by Coriolis forces, usually correspond to that eigenoscillation form, in the case of which the measuring tube also executes rotary oscillations about an imaginary vertical axis aligned perpendicular to the longitudinal axis. In the case of measuring transducers with straight measuring tubes, in contrast, for the purpose of producing Coriolis forces dependent on mass flow, such a wanted mode is often selected, in the case of which each of the measuring tubes at least partially executes bending oscillations essentially in a single imaginary plane of oscillation, such that the oscillations in the Coriolis mode accordingly are embodied as bending oscillations coplanar with the wanted mode oscillations, and having an equal oscillation frequency. For exciting oscillations of the at least two measuring tubes, measuring transducers of vibration-type additionally have an exciter mechanism driven during operation by an electrical driver signal (e.g. a controlled electrical current) which is generated and correspondingly conditioned by the mentioned driver electronics; wherein the exciter mechanism, by means of at least one electro-mechanical—especially electro-dynamic—oscillation exciter, which, during operation, is flowed through by an electrical current, and which acts practically directly, especially differentially, on the at least two measuring tubes, excites the measuring tube in the wanted mode to bending oscillations, especially opposite equal bending oscillations. Furthermore, such measuring transducers comprise a sensor arrangement with oscillation sensors, especially electro-dynamic, oscillation sensors for at least point registering inlet-side and outlet-side oscillations of at least one of the measuring tubes, especially opposite-equal bending oscillations of the measuring tubes in the Coriolis mode, and for producing electrical sensor signals, which are influenced by the process parameter to be registered (such as, for instance, the mass flow or the density), and which serve as vibration signals of the measuring transducer. As, for example, is described in U.S. Pat. No. 7,325,461, in the case of measuring transducers of the type being discussed, in given cases, the oscillation exciter can, at least at times, also be used as an oscillation sensor, and/or an oscillation sensor can at least at times be used as an oscillation exciter. The exciter mechanism of measuring transducers of the type being discussed usually includes at least one oscillation exciter, which is electrodynamic and/or acts differentially on the measuring tubes, while the sensor arrangement comprises an inlet-side, most often likewise electrodynamic, oscillation sensor, as well as at least one outlet-side oscillation sensor, which is essentially equally-constructed thereto. Such electrodynamic and/or differential oscillation exciters of measuring transducers of the vibration-type available on the market are formed by means of a magnet coil, through which an electrical current flows, at least at times, and which is affixed to one of the measuring tubes, as well as by means of a rather elongated, especially rod-shaped, permanent magnet, which interacts with the at least one magnet coil (especially plunging into this), and which serves as an armature, which is correspondingly affixed to the other measuring tube, which is to be moved in an opposite-equal manner. The permanent magnet and the magnet coil serving as the exciter coil are, in such case, usually oriented in such a way, that they essentially extend coaxially to one another. Additionally, in the case of conventional measuring transducers, the exciter mechanism is usually embodied and placed in the measuring transducer in such a manner, that it in each case acts essentially centrally on the measuring tubes. In such case, the oscillation exciter and, to this extent, the exciter mechanism—as, for example, is also shown in the case of the proposed measuring transducers—is externally affixed to the measuring tubes at least pointwise along an imaginary central peripheral line of each. As is, among other things, described in U.S. Pat. No. 6,092,429 or U.S. Pat. No. 4,823,614, as an alternative to an exciter mechanism formed by means of oscillation exciters acting rather centrally and directly on the measuring tubes, exciter mechanisms formed by means of two oscillation exciters affixed, in each case, not at the half-lengths of the measuring tubes, but rather on the inlet, or on the outlet, sides thereof can, for example, also be used. In the case of most measuring transducers of vibration-type available on the market, the oscillation sensors of the sensor arrangement are embodied so as to be essentially of equal construction to the at least one oscillation exciter, at least insofar as they work according to the same principle of action. Accordingly, the oscillation sensors of such a sensor arrangement also are, in each case, most often formed by means of at least one coil affixed to one of the measuring tubes, which is at least at times passed through by a variable magnetic field and, in association therewith, at least at times supplied with an induced measurement voltage, as well as by means of a permanently magnetic armature, which is affixed to another of the measuring tubes, which interacts with the at least one coil, and which delivers the magnetic field. Each of the aforementioned coils is additionally connected with the aforementioned transmitter electronics of the in-line measuring device by means of at least one pair of electrical connecting lines, which most often extend along as short a path as possible from the coils to the measuring transducer housing. Due to the superpositioning of the wanted and Coriolis modes, the oscillations of the vibrating measuring tubes registered by means of the sensor arrangement on the inlet side and on the outlet side also have a measurable phase difference, dependent on the mass flow. Usually, the measuring tubes of such (e.g. applied in Coriolis-mass flow meters) measuring transducers are, during operation, excited to an instantaneous natural resonance frequency of the oscillation form selected for the wanted mode, e.g. at a constant, controlled oscillation amplitude. Since this resonance frequency is also especially dependent on the instantaneous density of the medium, besides the mass flow, the density of flowing media can also additionally be measured by means of Coriolis mass flow meters typically available on the market. Additionally, as, for example, is shown in U.S. Pat. No. 6,651,513 or U.S. Pat. No. 7,080,564, it is also possible by means of measuring transducers of vibration-type directly to measure viscosity of the medium flowing through, for example, based on an exciter energy or excitation power required for maintaining the oscillations, and/or based on a damping of oscillations (especially those in the aforementioned wanted mode) of the at least one measuring tube, resulting from a dissipation of oscillatory energy. Moreover, other measured variables derived from the aforementioned primary measured values of mass flow rate, density and viscosity can also be ascertained, such as, for instance, the Reynolds number according to U.S. Pat. No. 6,513,393.

Especially in the case of application of measuring systems of the aforementioned type for measuring high viscosity (for example pasty, doughy or slurry-like) media, or also for measuring of media, in the case of which are conveyed solids with diameters in the order of magnitude of a caliber of a measuring tube, such as, for example, stone-containing slurries, concrete, fruit sauces (such as apple sauce), etc., an increased risk exists that one of the measuring tubes becomes partially or completely plugged, for example, as a result of a solid jammed in one of the measuring tubes, while the other of the measuring tubes is still flowed through by the medium. As a result of such a partial plugging of the tube arrangement, the measuring transducer is, without such being recognized, now flowed through only asymmetrically; in given cases, also in such a manner, that the medium flows only in one of the measuring tubes, or one of the measuring tubes is no longer flowed through. However, with conventional measuring systems of the type being discussed, such an asymmetric flow through the measuring transducer or a partial plugging of the tube arrangement causing this is, in measuring operation—here, thus, with medium flowing through the measuring transducer and measuring tubes oscillating in the wanted mode—not, at present, detectable, nor has any attempt at all been made to detect such. In the previously mentioned U.S. Pat. No. 7,421,350, a method has been provided for detection of media residues remaining in the measuring transducer after its emptying, which can correspondingly also be used for detection of plugging, wherein, on the basis of an exceeding of a limit value set, in the case of an emptied measuring system, for an oscillation parameter derived for one of the vibration signals (e.g. a resonance frequency of the wanted mode), it is detected whether or not medium is nevertheless still in the measuring transducer after the measuring system is thought to have been emptied; however, an application of said method for flowed-through measuring systems is not directly possible, because an exceeding of the aforementioned limit value can also be attributed solely to a significant change of properties of the medium, such as, for instance, the density and/or the viscosity. Also, the phase shift between the vibration-signals typically measured in measuring systems of the aforementioned type is not a reliable indicator for a partial plugging of the measuring transducer, because the at least one measuring tube still flowed through furthermore also oscillates in the Coriolis mode, and, thus, the vibration signals produced by means of the sensor arrangement are still phase shifted with respect to one another.

Since it is—at least in the case of applications, for instance, in the pharmaceuticals industry or the foods industry, not least of all for hygienic reasons—however, quite desirable, to also be able to detect and correspondingly signal a partial plugging during running measurement operation both reliably and an as early as possible (for instance, directly after occurrence), an object of the invention is to provide a method for monitoring a tube arrangement having at least two measuring tubes which, during operation, are flowed through in parallel by the medium; especially a method for detecting a plugging even of only one of the measuring tubes of said tube arrangement; as well as a measuring arrangement for this method.

For achieving the object, the invention resides in a method for monitoring a tube arrangement formed by means of a first measuring tube and at least a second measuring tube, which connected for parallel flow with the first, wherein the method comprises steps as follows:

Permitting medium to flow through the tube arrangement;
ascertaining a temperature difference existing between the first measuring tube and the second measuring tube; and
signaling a partial plugging of the tube arrangement, for example a plugging of exactly one of the measuring tubes and/or a plugging of the first measuring tube, in the case of a simultaneously non-plugged, second measuring tube, if the ascertained temperature difference deviates from a predetermined limit value representing the temperature difference of a non-plugged tube arrangement.

Moreover, the invention resides in a measuring system (for example, embodied as a compact measuring device and/or as a Coriolis mass flow-measuring device) for a medium flowing through a pipeline—for example, an aqueous liquid, a slurry, a paste or other flowable material—wherein the measuring system (which is, for example, embodied as a compact measuring device and/or as a Coriolis mass flow measuring device) comprises: A measuring transducer (through which the medium flows during operation) for producing vibration signals corresponding with parameters of the flowing medium, for example a mass flow rate, a density and/or a viscosity; as well as a transmitter electronics electrically coupled with the measuring transducer for activating the measuring transducer and for evaluating measuring signals delivered by the measuring transducer; wherein the measuring transducer has an inlet-side, first flow divider with at least two flow openings which are spaced apart from one another, an outlet-side, second flow divider with at least two flow openings which are spaced apart from one another, at least two measuring tubes connected to the flow dividers, especially equally constructed flow dividers, for forming a tube arrangement having at least two flow paths connected for conveying flowing medium with parallel flow, of which a first measuring tube opens with an inlet-side first measuring tube end into a first flow opening of the first flow divider and with an outlet-side second measuring tube end into a first flow opening of the second flow divider; and a second measuring tube opens with an inlet-side first measuring tube end into a second flow opening of the first flow divider and with an outlet-side second measuring tube end into a second flow opening of the second flow divider; wherein the measuring system, for monitoring the tube arrangement, also has a temperature measuring arrangement connected to the transmitter electronics, wherein the temperature measuring arrangement, for producing a temperature signal dependent on a temperature of the first measuring tube, has a first temperature sensor, especially a first temperature sensor affixed directly to the first measuring tube and/or formed as a resistance thermometer, and, for producing a temperature signal dependent on a temperature of the second measuring tube, has at least a second temperature sensor, especially a second temperature sensor affixed directly to the second measuring tube and/or formed as a resistance thermometer. Additionally, it is provided that the transmitter electronics, with application of the temperature signal produced by means of the first temperature sensor and the temperature signal produced by means of the second temperature sensor, for example, a second temperature sensor constructed essentially equally to the first temperature sensor, generates, at least at times, an alarm signaling a partial plugging of the tube arrangement, especially a plugging of exactly one of the measuring tubes and/or a plugging of the first measuring tube, in the case of simultaneously non-plugged, second measuring tube.

According to a first embodiment of the measuring system of the invention, it is additionally provided that the transmitter electronics, making use of the temperature signal produced by means of the first temperature sensor and of the temperature signal produced by means of the second temperature sensor (which is, for example, essentially equally constructed to the first temperature sensor), at least at times generates an alarm signaling a partial plugging of the tube arrangement, if the temperature signal produced by means of the first temperature sensor and the temperature signal produced by means of the second temperature sensor deviate from one another with regard to at least one signal parameter derived in each case therefrom, especially a temporal average value of a signal amplitude of each of the two temperature signals, a variation of a signal amplitude of each of the two temperature signals, a cross correlation of the two temperature signals or the like, in excess of a limit value correspondingly predetermined therefor.

According to a second embodiment of the measuring system of the invention, it is additionally provided that the transmitter electronics, making use of a temperature difference signal formed by means of the temperature signal produced by means of the first temperature sensor and of the temperature signal produced by means of the second temperature sensor, this temperature difference signal representing a temperature difference existing between the first measuring tube and the second measuring tube, generates an alarm signaling a partial plugging of the tube arrangement, if the temperature difference represented by the temperature difference signal deviates from a therefor predetermined limit value representing a non-plugged tube arrangement.

According to a third embodiment of the measuring system of the invention, it is additionally provided that the first temperature sensor and the second temperature sensor are embodied and placed in the measuring transducer in such a manner, that the first temperature sensor, for instance, reacts as equally rapidly with a change of its temperature signal to a change in the temperature of the first measuring tube as the second temperature sensor reacts with a change of its temperature signal to a change in the temperature the second measuring tube.

According to a fourth embodiment of the measuring system of the invention, it is additionally provided that the first temperature sensor and the second temperature sensor are embodied and placed in the measuring transducer in such a manner, that the temperature signal produced by means of the first temperature sensor is dependent predominantly on the temperature of the first measuring tube, and the temperature signal produced by means of the second temperature sensor is dependent predominantly on the temperature of the second measuring tube.

According to a fifth embodiment of the measuring system of the invention, it is additionally provided that the first temperature sensor and the second temperature sensor are embodied and placed in the measuring transducer in such a manner, that the temperature signal produced by means of the first temperature sensor is more closely correlated with the temperature of the first measuring tube than the temperature signal produced by means of the second temperature sensor.

According to a sixth embodiment of the measuring system of the invention, it is additionally provided that the first temperature sensor and the second temperature sensor are embodied and placed in the measuring transducer in such a manner, that the temperature signal produced by means of the second temperature sensor is more closely correlated with the temperature of the second measuring tube than the temperature signal produced by means of the first temperature sensor.

According to a seventh embodiment of the measuring system of the invention, it is additionally provided that the transmitter electronics, making use of the temperature signal produced by means of the first temperature sensor and of the temperature signal produced by means of the second temperature sensor (which is, for example, essentially equally constructed to the first temperature sensor), at least at times produces a temperature measured value, which represents a temperature of the medium flowing in the tube arrangement, especially when the transmitter electronics do not detect a partial plugging of the tube arrangement.

According to an eight embodiment of the measuring system of the invention, it is additionally provided that the first temperature sensor is affixed to the first measuring tube, and/or that the second temperature sensor is affixed to the second measuring tube. Developing this embodiment of the invention further, it is additionally provided that, except for the first temperature sensor, no further temperature sensor is affixed to the first measuring tube, and/or that except for the second temperature sensor, no further temperature sensor is affixed to the second measuring tube.

According to a ninth embodiment of the measuring system of the invention, it is additionally provided that the measuring transducer has four measuring tubes for conveying the flowing medium, which, forming a tube arrangement with four flow paths, which are connected for parallel flow, are connected to, especially equally-constructed, flow dividers. Developing this embodiment of the invention further, it is additionally provided that the temperature measuring arrangement has a third temperature sensor for producing a temperature signal dependent on a temperature of a third measuring tube of the measuring transducer, and at least a fourth temperature sensor for producing a temperature signal dependent on a temperature of a fourth measuring tube of the measuring transducer.

According to a tenth embodiment of the measuring system of the invention, it is additionally provided that the measuring transducer further comprises a measuring transducer housing with an inlet-side first housing end, especially a first housing end having a connecting flange for a line segment conveying the medium to the measuring transducer and/or a first housing end formed by means of the first flow divider, and an outlet-side, second housing end, especially a second housing end having a connecting flange for a line segment conveying the medium away from the measuring transducer, and/or a second housing end formed by means of the second flow divider. Developing this embodiment of the invention further, it is additionally provided that the temperature measuring arrangement has, for producing a temperature signal dependent on a temperature of the measuring transducer housing, at least a third temperature sensor, which is especially affixed directly to the measuring transducer housing and/or embodied as a resistance thermometer. Making use of the temperature signal produced by the first temperature sensor as well as the temperature signal produced by the third temperature sensor, the transmitter electronics can then, for example, generate a report, which signals that the temperature signals delivered by the temperature measuring arrangement for monitoring the tube arrangement for partial plugging are suitable, insofar as a temperature of the medium in the measuring transducer deviates from a temperature of the measuring transducer housing; and/or the transmitter electronics can then, for example, generate a report, which signals that the temperature signals delivered by the temperature measuring arrangement for monitoring the tube arrangement for partial plugging are not instantaneously suitable, insofar as a temperature of the medium in the measuring transducer does not deviate or only deviates insufficiently from a temperature of the measuring transducer housing.

According to an eleventh embodiment of the measuring system of the invention, it is additionally provided that the measuring transducer further comprises at least one electromechanical, especially electrodynamic, oscillation exciter for exciting and/or maintaining vibrations of the at least two measuring tubes—especially of opposite equal bending oscillations of each of the at least two measuring tubes about an imaginary oscillation axis in each case imaginarily connecting an inlet-side, first measuring tube end of the particular measuring tube and an outlet-side, second measuring tube end of the particular measuring tube—with a natural resonance frequency of the measuring transducer.

According to a twelfth embodiment of the measuring system of the invention, it is additionally provided that the measuring transducer further comprises:
  a first oscillation sensor, especially an electrodynamic one, for registering inlet-side vibrations of the at least two measuring tubes and for producing a first vibration signal of the measuring transducer representing vibrations of at least one of the measuring tubes, especially inlet-side vibrations of the first measuring tube relative to the second measuring tube; and
  a second oscillation sensor, especially an electrodynamic one, for registering outlet-side vibrations of the at least two measuring tubes and for producing a second vibration signal of the measuring transducer representing vibrations of at least one of the measuring tubes, especially outlet-side vibrations of the first measuring tube relative to the second measuring tube. Developing this embodiment of the invention further, it is additionally provided that the transmitter electronics, making use of at least one of the vibration signals, generates an alarm signaling partial plugging of the tube arrangement, if said vibration signal deviates from a limit value correspondingly predetermined therefor with regard to at least one signal parameter in each case derived therefrom, especially a temporal average value of a signal amplitude, a variation of a signal amplitude, a signal frequency or the like. Moreover, the transmitter electronics can, however, by means of the first vibration signal and by means of the second vibration signal, also generate a phase difference measured value, which represents a phase difference existing between the first vibration signal and the second vibration signal, especially a phase difference dependent on a mass flow rate of the medium flowing in the measuring transducer, and/or generate a mass flow-measured value, which represents a mass flow rate of medium flowing in the measuring transducer.

A basic idea of the invention is to use the heat flux regularly arising as a result of a partial plugging of pipe arrangements of the type being discussed between the plugged, no longer flowed-through tube and the non-plugged, still flowed-through measuring tube—or the temperature gradients resulting therefrom—as an indicator variable for monitoring the tube arrangement. The invention is based, among other things, on the recognition that, on the one hand, usually, in applications in industrial measuring and automation technology, media with a temperature deviating significantly from a surrounding temperature of the measuring system are to be measured, not least of all also during cleanings of such pipe arrangements regularly performed in the installed state by means of hot water or vapor; and that, on the other hand, in the case of pipe arrangements with measuring tubes parallelly flowed-through in undisturbed operation, in the case of a plugging of one of the measuring tubes, after a comparatively short time, a significant, very easily detected temperature difference relative to the other, still flowed-through measuring tube or a corresponding heat flux between measuring tubes of partially plugged pipe arrangements can already be detected.

BRIEF DESCRIPTION OF THE DRAWINGS

The invention, as well as other advantageous embodiments and utilities thereof, will now be explained in greater detail on the basis of the appended drawing. Equal parts are provided with equal reference characters in all figures; when required for reasons of perspicuity, or when such otherwise appears sensible, already mentioned reference characters are omitted in subsequent figures. Other advantageous embodiments or further developments, also especially combinations of aspects of the invention first explained only individually, will become further evident from the figures of the drawing, as well as from the dependent claims as such.

The figures of the drawing show as follows:

FIGS. 1 and 2 show in different side views, a measuring system, embodied as a compact measuring device, for media flowing in pipelines;

DETAILED DISCUSSION IN CONJUNCTION WITH THE DRAWINGS

Figure 3:
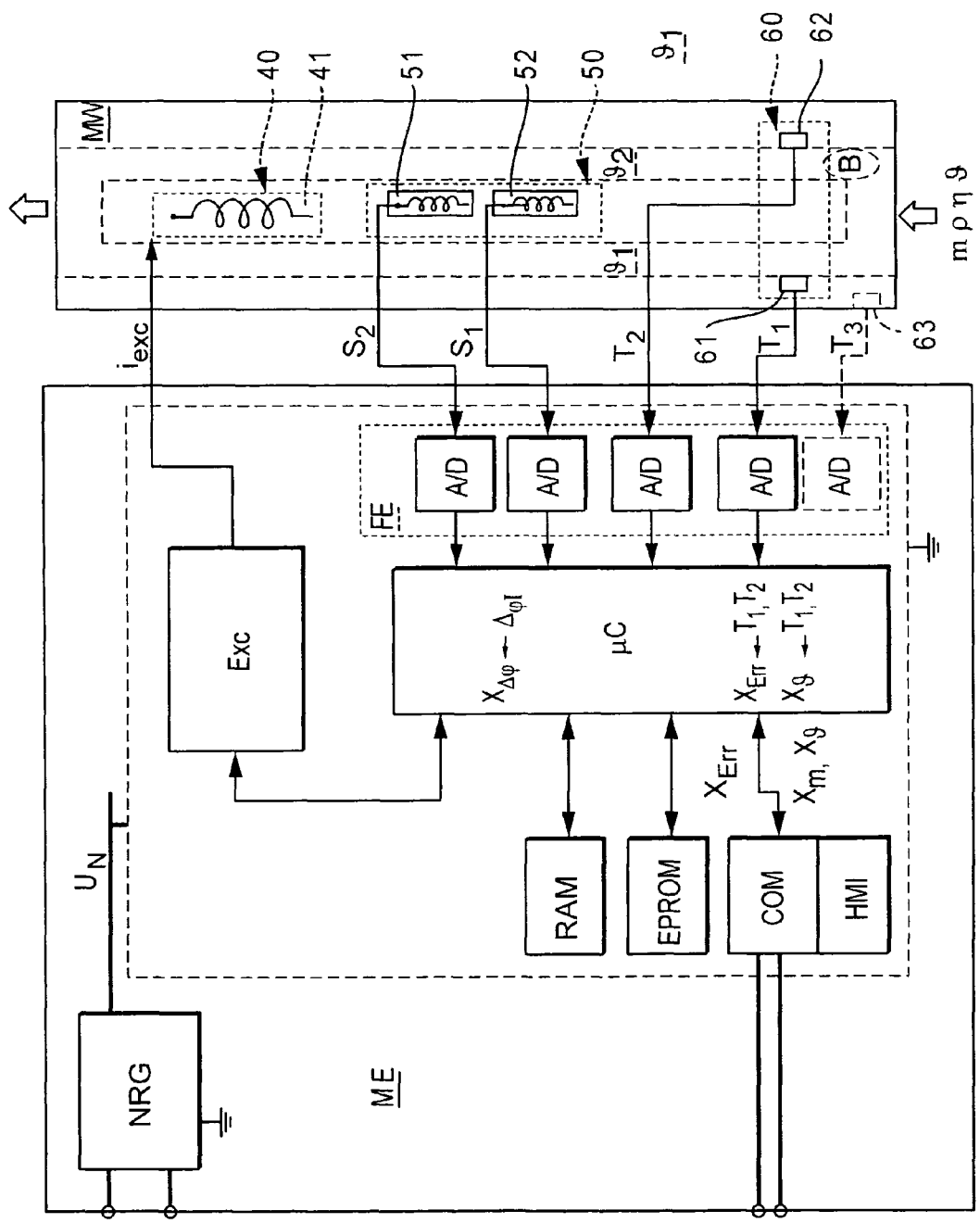
FIG. 3 shows schematically, in the manner of a block diagram, a transmitter electronics—especially also one suitable for a measuring system according to FIGS. 1, 2—with connected, partially plugged tube arrangement having two measuring tubes which, in undisturbed operation, are flowed-through in parallel.

FIGS. 1, 2 show schematically an example of an embodiment of a measuring system for flowable, especially fluid, media. The measuring system is insertable in a process line (not shown here), for instance, a pipeline of an industrial plant, is embodied, for example, as a Coriolis, mass flow measuring device, density measuring device, viscosity measuring device or the like, and especially serves for measuring and/or monitoring at least one physical parameter of the medium, such as, for instance, a mass flow rate, a density, a viscosity or the like. The measuring system—implemented here as an in-line measuring device in compact construction—comprises for this a measuring transducer MT, which is connected to the process line via an inlet end #111 as well as an outlet end #112, and which serves for registering the at least one parameter and its converting of measurement signals representative therefor; wherein the measuring transducer is, during operation, correspondingly flowed through by the medium to be measured (such as, for instance, a low-viscosity liquid and/or a high-viscosity paste), and is connected to transmitter electronics TE of the measuring system, which are electrically coupled with the measuring transducer, and serve for activating the measuring transducer and for evaluating measurement signals delivered by the measuring transducer.

For registering the at least one parameter, the measuring transducer comprises, arranged in a measuring transducer housing 100 and activated during operation by the transmitter electronics TE, an inner part, which effects the physical-to-electrical converting of the at least one parameter to be measured. For conveying the flowing medium, the inner part and, insofar, the measuring transducer includes: An inlet-side, first flow divider $20_1$ having at least two mutually spaced, flow openings $20_{1A}$, $20_{1B}$ and serving for dividing inflowing medium in two flow portions; an outlet-side second flow divider $20_2$ having at least two mutually spaced, flow openings $20_{2A}$, $20_{2B}$ and serving for guiding the flow portions back together; as well as at least two, measuring tubes $18_1$, $18_2$ connected to the flow dividers $20_1$, $20_2$, especially equally-constructed, flow dividers $20_1$, $20_2$, for forming a tube arrangement having at least two flow paths connected for parallel flow. In such case, a first measuring tube $18_1$ opens with an inlet-side, first measuring tube end into a first flow opening $20_{1A}$ of the first flow divider $20_1$ and with an outlet-side, second measuring tube end into a first flow opening $20_{2A}$ of the second flow divider $20_2$ and a second measuring tube $18_2$ with an inlet-side, first measuring tube end into a second flow opening $20_{1B}$ of the first flow divider $20_1$ and with an outlet-side, second measuring tube end into a second flow opening $20_{2B}$ of the second flow divider $20_2$, so that thus medium flows through the two measuring tubes in undisturbed operation of the measuring system simultaneously and in parallel.

In the example of an embodiment shown here, the flow dividers are integral components of the measuring transducer housing, in that an inlet-side, first housing end defining the inlet end #111 of the measuring transducer is formed by means of the first flow divider and an outlet-side, second housing end defining the outlet end #112 of the measuring transducer is formed by means of the second flow divider. For the typical case, in which the measuring transducer MT is to be assembled releasably with the process line formed, for example, as a metal pipeline, there are provided on the inlet side of the measuring transducer a first connecting flange 13 for connection to a line segment of the process line supplying medium to the measuring transducer and on the outlet side a second connecting flange 14 for a line segment of the process line removing medium from the measuring transducer. The connecting flanges 13, 14 can, in such case, as quite usual in the case of measuring transducers of the described type also be welded on the housing ends and, thus, be integrated terminally in the measuring transducer housing 100.

The transmitter electronics, especially a transmitter electronics supplied during operation with electrical energy externally via connecting cable and/or by means of internal energy storer, in turn, includes, as shown in FIG. 3 schematically in the manner of a block diagram, a driver-circuit Exc serving for activating the measuring transducer, for example, one formed as a measuring transducer of vibration-type, as well as, for processing measurement signal of the measuring transducer MT, for example, by means of a microcomputer formed and/or communicating during operation with the driver-circuit Exc, a measuring and evaluating circuit µC of the measuring system, which delivers, during operation, measured values representing the at least one measured variable, e.g. the instantaneous, or a totaled, mass flow, i.e. the instantaneous mass flow rate or an integrated mass flow rate. The driver-circuit Exc and the evaluating-circuit µC as well as other electronics components of the transmitter electronics serving the operation of the measuring system, such as, for instance, internal energy supply circuits ESC for providing internal supply voltages $U_N$ and/or communication circuits COM serving for connection to a superordinated measurement data processing system and/or to a fieldbus, are, furthermore, accommodated in a corresponding electronics housing 200, especially an impact- and/or also explosion-resistant and/or hermetically sealed electronics housing 200. The electronics housing 200 of the in-line measuring device can be mounted, for example, directly on the measuring transducer housing 100 for forming of a measuring device with compact construction. For visualizing, on-site, measured values internally produced in the measuring system and/or, in given cases, status reports internally generated in the measuring system, such as, for instance, an error report or an alarm, the measuring system can have, furthermore, an display- and operating element HMI communicating at least at times with the transmitter electronics, such as, for instance, an LCD-, OLED- or TFT-display placed in the electronics housing behind a window correspondingly provided therein, as well as a corresponding input keypad and/or a touch screen. In advantageous manner, the transmitter electronics TE, especially a programmable and/or remotely parameterable, transmitter electronics TE, can additionally be so designed, that it can, during operation of the in-line measuring device, exchange with an electronic data processing system superordinated thereto, for example, a programmable logic controller control (PLC), a personal computer and/or a work station, via a data transmission system, for example, a fieldbus system and/or wirelessly per radio, measuring, and/or other, operating data, such as, for instance, current measured values or tuning- and/or diagnostic values serving for control of the in-line measuring device. In such case, the transmitter electronics TE can, for example, have an internal energy supply circuit ESC, which is fed via the aforementioned fieldbus system during operation from an external energy supply provided in the data processing system. In an embodiment of the invention, the transmitter electronics is additionally so embodied, that it is electrically connectable by means of a two-wire connection 2L (configured, for example, as a 4-20 mA-current loop) with the external, electronic data processing system, by means of which connection, it can be supplied with electrical energy as well as transmit measured values to the data processing system. For the case, in which the measuring system is to be equipped for coupling to a fieldbus- or another communication system, the transmitter electronics TE can have a corresponding communication interface COM for data communication according to one of the relevant industry standards. The electrical connecting of the measuring transducer to the mentioned transmitter electronics can occur by means of corresponding connecting lines, which extend from the electronics housing 200, for example, via cable feed-through, and run, at least sectionally, within the measuring transducer housing. The connecting lines can, in such case, be embodied, at least partially as electrical line wires encased, at least sectionally, in electrical insulation, e.g. in the form of "twisted pair" lines, flat ribbon cables and/or coaxial cables. Alternatively thereto or in supplementation thereof, the connecting lines can, at least sectionally, also be formed by means of conductive traces of a circuit board, especially a flexible, in given cases, lacquered, circuit board; compare, for this, also the initially mentioned U.S. Pat. No. 6,711,958 or U.S. Pat. No. 5,349,872.

Figure 4:
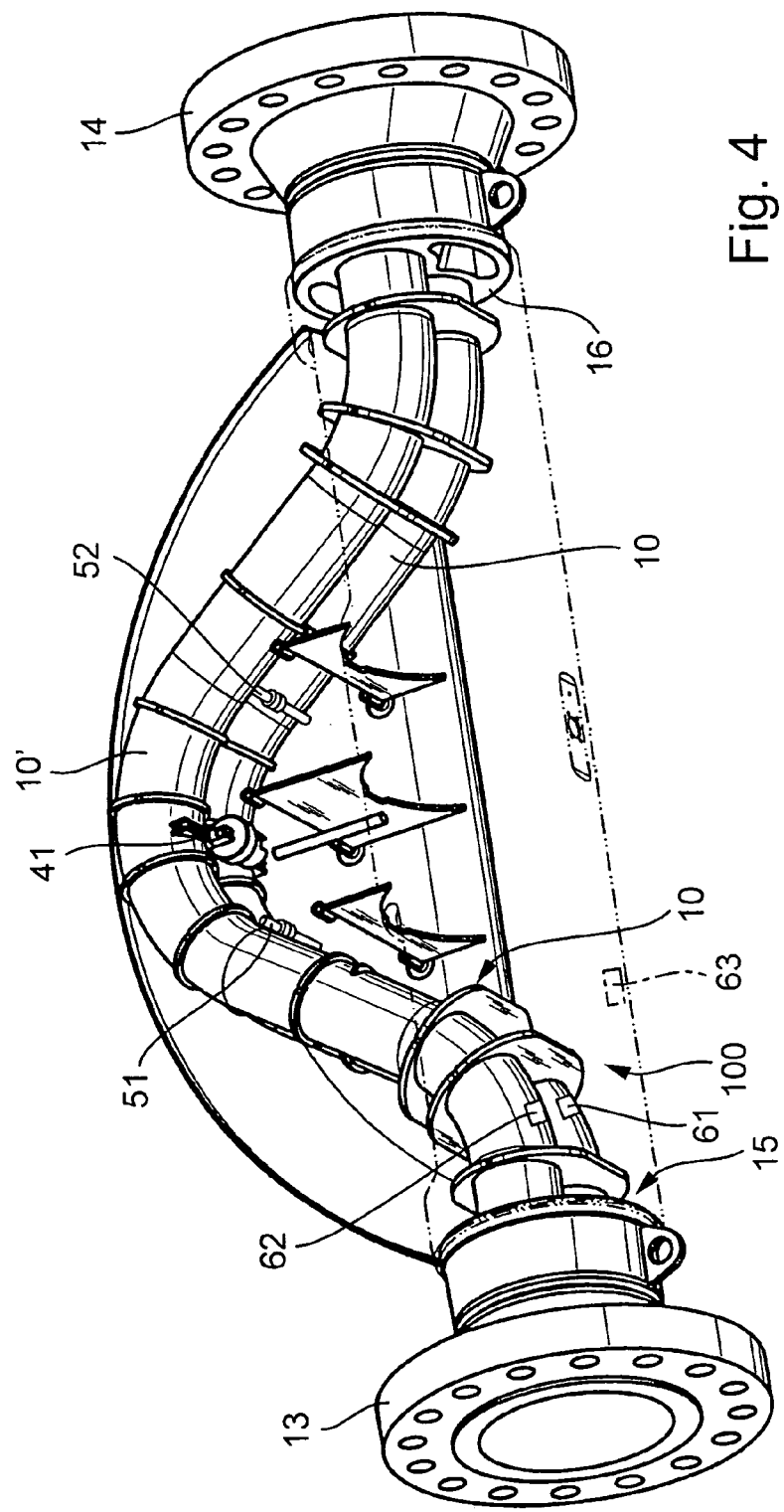
FIGS. 4 and 5 show in partially sectioned or perspective views, a measuring transducer of vibration-type, especially suitable for a measuring system according to FIGS. 1, 2.
Figure 5:
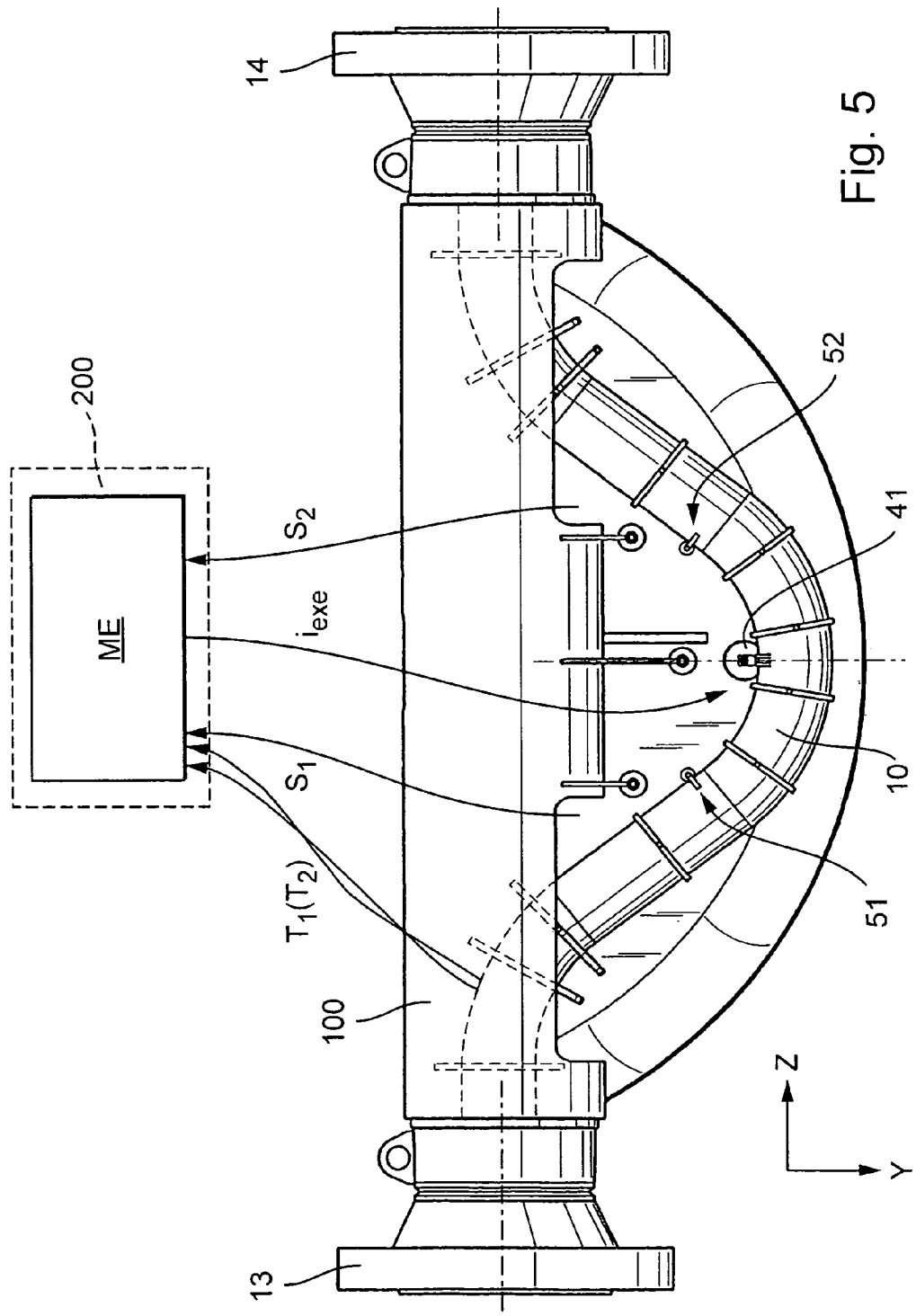

Presented schematically in FIGS. 4 and 5 is an example of an embodiment for a measuring transducer MT suited for implementing the measuring system. The measuring transducer MT shown there is embodied as a measuring transducer of vibration-type and serves, generally, to produce in a through flowing medium, for instance, a gas and/or a liquid, mechanical reaction forces, e.g. mass flow dependent, Coriolis forces, density dependent, inertial forces and/or viscosity dependent, frictional forces, which react on the measuring transducer registerably by sensor and, insofar, also measurably. On the basis of these reaction forces, thus, e.g. a mass flow rate m, a density $\rho$ and/or a viscosity $\eta$ of the medium can be measured. In the example of an embodiment illustrated in FIGS. 4 and 5, each of the two measuring tubes 10, 10' extending, in each case, with an oscillatory length between its inlet-side, first measuring tube end 11# and its outlet-side, second measuring tube end 12# is at least sectionally curved. For producing the aforementioned reaction forces, each of the two measuring tubes is caused to vibrate during operation at least over its oscillatory length—, for example, with equal oscillation frequency as the in each case, other measuring tube, however, with phase opposite thereto- and, in such case, is repeatedly elastically deformed, such that it oscillates about a static rest position. The particular oscillatory length corresponds, in such case, to a length of an imaginary central- or also centroidal axis (imaginary connecting line through the centers of gravity of all cross sectional areas of the particular measuring tube) extending within the lumen (in the case of a curved measuring tube, thus a stretched length of the respective measuring tube 10, or 10'. According to an additional embodiment of the invention, each of the measuring tubes is caused during operation to vibrate in such a manner that it oscillates, especially in a bending oscillation mode, about an oscillation axis, which is parallel to or coincident with an imaginary connecting axis imaginarily connecting the two measuring tube ends 11#, 12# or 11#', 12#', as the case may be. The measuring tubes, oscillating during operation, for example, essentially with opposite phase relative to one another, are in the here illustrated example of an embodiment, mechanically connected with one another by means of a first coupling element, for example, a plate-shaped, first coupling element, for forming a first coupling zone on the inlet side and by means of a second coupling element, for example, a plate-shaped, second coupling element and/or a second coupling element constructed equally to the first coupling element, for forming a second coupling zone on the outlet side. Thus, the first coupling zone defines here, in each case, an inlet-side, first measuring tube end 11#, 11'# of each of the two measuring tubes 10, 10' and the second coupling zone, in each case, an outlet-side, second measuring tube end 12#, 12'# of the respective measuring tubes 10, or 10'. Each of the measuring tubes is additionally so formed and arranged in the measuring transducer, that the aforementioned connecting axis extends essentially parallel to, and, in given cases, even coincides with, an imaginary longitudinal axis L of the measuring transducer imaginarily connecting in- and outlet ends of the measuring transducer. Each of the measuring tubes (for example, measuring tubes manufactured from stainless steel, titanium, tantalum, or zirconium or an alloy thereof) of the measuring transducer and, thus, also an imaginary center line of the respective measuring tube extending within the lumen can be embodied e.g. essentially U-shaped or, as well as also shown in FIGS. 4 and 5, essentially V-shaped. As directly evident from the combination of FIGS. 4 and 5, each of the at least two measuring tubes 10 is here additionally, in each case, so formed, that the aforementioned center line, as quite usual in the case of measuring transducers of the type being discussed, lies in an imaginary tube plane of the measuring transducer. Since the measuring transducer should be applicable for a large number of most varied applications, especially in the field of industrial measuring- and automation technology, it is further provided, that each of the measuring tubes, depending on application of the measuring transducer, has a diameter, which lies in the range between, for instance, 1 mm and, for instance, 100 mm. It is additionally noted here, that—although the measuring transducer in the example of an embodiment illustrated in FIGS. 4 and 5 has two curved measuring tubes and at least, insofar, in its mechanical construction, as well as also its principle of action resembles the measuring transducers proposed in U.S. Pat. No. 6,920,798 or U.S. Pat. No. 5,796,011, or also those available from the assignee under the type designation "PROMASS E" or "PROMASS F"—the invention, of course, also can find application with measuring transducers with straight and/or more than two measuring tubes, for example, thus four parallel measuring tubes, for instance, comparable to the measuring transducers illustrated in the initially mentioned U.S. Pat. No. 5,602,345 or WO-A 96/08697 or, for example, also those available from the assignee under the type designation "PROMASS M".

For active exciting of mechanical oscillations of the at least two, especially mutually parallel and/or as regards shape and material equally-constructed, measuring tubes, especially to one or a plurality of their natural eigenfrequencies dependent on the density of the therein, in each case, instantaneously guided medium, the measuring transducer is additionally provided with an electromechanical exciter mechanism 40, especially an electrodynamic exciter mechanism 40, thus one formed by means of a plunging armature coil, or solenoid. This serves—operated by an exciter signal, e.g. an exciter signal having a controlled electrical current and/or a controlled voltage, delivered by the driver-circuit of the transmitter electronics and, in given cases, correspondingly conditioned in interaction with the measuring- and evaluating-circuit—, in each case, to convert electrical exciter energy, or—power $E_{exc}$ fed by means of the driver-circuit into an exciter force $F_{exc}$ acting on the at least two measuring tubes, e.g. with pulse shape or harmonically, and deflecting these in which above-described manner. The exciter force $F_{exc}$ can, as usual in the case of such measuring transducers, be bidirectional or unidirectional and set in the manner known to those skilled in the art, e.g. by means of an electrical current- and/or voltage, control circuit, as regards its amplitude, and, e.g. by means of a phases-control loop (PLL), as regards its frequency, matched to an instantaneous mechanical eigenfrequency of the tube arrangement. The construction and application of such a phase control-loop serving the aligning of an exciter frequency, $f_{exc}$, of the exciter signal to the instantaneous eigenfrequency of the desired wanted mode is described at length e.g. in U.S. Pat. No. 4,801,897. Of course, also other driver circuits known, per se, to those skilled in the art to be suitable for the tuning the exciter energy $E_{exc}$, can be used, for example, also according to the initially mentioned U.S. Pat. Nos. 4,879,911, 5,009,109, 5,050,439, or U.S. Pat. No. 6,311,136. Additionally, as regards an application of such driver circuits for measuring transducers of vibration-type, reference is made to the transmitter electronics provided with measurement transmitters of the series "PROMASS 83", as available from the assignee, for example, in connection with measuring transducers of the series "PROMASS E", "PROMASS F", "PROMASS M". Their driver circuit is, for example, in each case, so executed, that the lateral bending oscillations in the wanted mode are controlled to a constant amplitude, thus largely independent also of density, ρ.

According to an additional embodiment of the invention, the at least two measuring tubes 10 are actively excited during operation by means of the exciter mechanism, at least at times, in a wanted mode, in which they, especially predominantly or exclusively, execute bending oscillations about the mentioned imaginary oscillation axis, for example, predominantly with exactly one natural eigenfrequency (resonance frequency) of the tube arrangement, such as, for instance, that, which corresponds to a bending oscillation fundamental mode, in which each of the measuring tubes has exactly one oscillatory antinode. Especially, in such case, it is additionally provided, that each of the measuring tubes, as quite usual in the case of such measuring transducers with curved measuring tubes, is so excited by means of the exciter mechanism to bending oscillations at an exciter frequency $f_{exc}$, that it bends out in the wanted mode, oscillatingly about the mentioned imaginary oscillation axis—, for instance, in the manner of an unilaterally clamped cantilever —, at least partially according to one of its natural bending oscillation forms. The bending oscillations of the measuring tubes actively excited by means of the exciter mechanism have, in such case, in each case, in the region of the inlet-side coupling zone defining the particular inlet-side measuring tube end an inlet-side oscillation node and in the region of the outlet-side coupling zone defining the particular outlet-side measuring tube end an outlet-side oscillation node, so that thus the particular measuring tube extends with its oscillatory length between these two oscillation nodes essentially freely oscillatingly. As usual in the case of measuring transducers with a tube arrangement of the type being discussed, the measuring tubes are, by means of the exciter mechanism acting, for example, differentially between both measuring tubes, in such case, especially so excited, that they execute during operation, at least at times and at least partially, opposite-equal bending oscillations about the longitudinal axis L. In other words, the two measuring tubes 10, 10' move then, in each case, in the manner of tuning fork tines oscillating relative to one another. For this case, according to an additional embodiment of the invention, the exciter mechanism is designed to excite, or to maintain, opposite-equal vibrations of the first measuring tube and the second measuring tube, especially bending oscillations of each of the measuring tubes about an imaginary oscillation axis imaginarily connecting the particular first measuring tube end and the particular second measuring tube end. Serving as exciter mechanism 40, in such case, can be e.g. an exciter mechanism 40 formed in conventional manner by means of an electrodynamic oscillation exciter 41—, for example, a single electrodynamic oscillation exciter 41—placed centrally, thus in the region of a half oscillatory length, between the at least two measuring tube and acting differentially on the measuring tubes. The oscillation exciter 41 can, as indicated in FIG. 4 be formed, for example, by means of a cylindrical exciter coil secured on the first measuring tube, through which during operation a corresponding exciter current flows, and, associated therewith, is permeated by a corresponding magnetic field, as well as a permanently magnetic armature, which at least partially plunges into the exciter coil, and which is affixed externally, especially centrally, on the second measuring tube. Other exciter mechanisms for producing oscillations of the at least two measuring tube and also quite suitable for the measuring system of the invention are shown e.g. in the initially mentioned U.S. Pat. Nos. 4,680,974, 4,738,144, 4,768,384, 4,801,897, 4,823,614, 4,879,911, 5,009,109, 5,050,439, 5,359,881, 5,602,345, 5,734,112, 5,796,011, 5,926,096, 5,969,264, 7,127,952, 6,092,429, 6,311,136, 6,883,387, 7,325,461, 7,392,709, or U.S. Pat. No. 7,421,350.

For causing the at least two measuring tubes of the measuring transducer to vibrate, the exciter mechanism 40 is, as already mentioned, fed by means of a likewise oscillating, exciter signal of adjustable exciter frequency, $f_{exc}$, so that an exciter current $i_{exc}$, correspondingly controlled in its amplitude, flows during operation through the exciter coil of the oscillation exciter—here, a single oscillation exciter acting on the measuring tube 10—, whereby a magnetic field required for moving the measuring tubes is produced. The driver- or also, exciter, signal, or its exciter current $i_{exc}$, can be e.g. harmonically, multifrequently or also rectangularly formed. The exciter frequency, $f_{exc}$, of the exciter current required for maintaining the actively excited vibrations of the measuring tubes can, in the case of the measuring transducer illustrated in the example of an embodiment, in advantageous manner be so selected and set, that the measuring tubes, as already mentioned, oscillate predominantly in a bending oscillation, fundamental mode having a single oscillatory antinode. In accordance therewith, according to an additional embodiment of the invention, the exciter—or also wanted mode frequency, $f_{exc}$, is so set, that it corresponds as exactly as possible to an instantaneous eigenfrequency of bending oscillations of at least one of the measuring tubes 10, especially that of a bending oscillation, fundamental mode. For the operationally provided case, in which the medium flows in the process line and, thus, the mass flow m in the tube arrangement is different from zero, also Coriolis forces are induced in the through flowing medium by means of the measuring tubes vibrating in above described manner. These, in turn, react on the measuring tubes, through which medium is flowing, and effect, thus, an additional deformation of the same, registerable by sensor, and, indeed, essentially according to an additional natural eigenoscillation form of higher modal order than the wanted mode. An instantaneous value of this socalled Coriolis mode superimposed on the excited, wanted mode with equal frequency is, in such case, especially as regards its amplitude, also dependent on the instantaneous mass flow m. As Coriolis mode can serve, as usual in the case of measuring transducers with curved measuring tubes, e.g. the eigenoscillation form of the anti-symmetric, twist mode, thus that, in the case of which, the measuring tubes, through which, in each case, medium is flowing, executes, as already mentioned, also rotary oscillations about an imaginary rotary oscillation axis directed perpendicularly to the bending oscillation axis. This rotary oscillation axis imaginarily cuts the center line of the respective measuring tube in the region of half the oscillatory length.

For registering vibrations of the measuring tubes, especially also oscillations in the Coriolis mode, the measuring transducer includes additionally a corresponding sensor arrangement 50. This comprises, as also schematically presented in FIGS. 4 and 5, at least a first oscillation sensor 51, for example, an electrodynamic, first oscillation sensor 51 and/or a first oscillation sensor 51 spaced from the at least one oscillation exciter and arranged between the at least two measuring tubes 10. The first oscillation sensor 51 delivers a first vibration measurement signal $s_1$ of the measuring transducer representing vibrations of at least one of the two measuring tubes, for example, a signal representing also opposite-equal vibrations of the at least two measuring tubes. For example, the signal can be a voltage corresponding to the oscillations or an electrical current corresponding to the oscillations. Additionally, it is provided, according to a further development of the invention, that the sensor arrangement has at least a second oscillation sensor 52, for example, a second oscillation sensor 52 spaced from the first oscillation sensor 51 and arranged between the at least two measuring tubes 10 and/or an electrodynamic, second oscillation sensor 52. The second oscillation sensor 52 delivers a second vibration measurement signal $s_2$ the measuring transducer representing vibrations of at least one of the two measuring tubes, for example, a signal representing also opposite-equal vibrations of the at least two measuring tubes. The oscillation sensors of the sensor arrangement can, in advantageous manner, additionally be so embodied, that they deliver vibration measurement signals of the same type, for example, in each case, a signal voltage, or a signal current. In the example of an embodiment shown here, the first oscillation sensor 51 is arranged on the inlet side between the at least two measuring tubes 10 and the second oscillation sensor 52 is arranged on the outlet side between the at least two measuring tubes 10, especially spaced equally far from the at least one oscillation exciter, or from the center of the measuring tubes 10, as the first oscillation sensor, or in such a manner, that opposite-equal vibrations of the two measuring tubes are differentially registered. The oscillation sensors of the sensor arrangement can, however, also, for example, be so embodied and arranged in the measuring transducer, that they register, as, among other things, also provided in U.S. Pat. No. 5,602,345, the oscillations relative to the measuring transducer housing.

Each of the—typically broadband—vibration signals $s_1$, $s_2$ of the measuring transducer MT has, in such case, in each case, corresponding to the wanted mode, a signal component having a signal frequency corresponding to the instantaneous oscillation frequency, $f_{exc}$, of the measuring tubes oscillating in the actively excited, wanted mode and a phase shift dependent on the current mass flow of the medium flowing in the tube arrangement relative to the exciter signal $i_{exc}$ generated, for example, by means of a PLL circuit as a function of a phase difference existing between at least one of the vibration signals $s_1$, $s_2$ and the exciter current in the exciter mechanism. Even in the case of application of a rather broadband exciter signal $i_{exc}$, it can, as a result of the most often very high oscillation quality factor of the measuring transducer MT, be assumed, that the signal component of each of the vibration signals corresponding to the wanted mode predominates over other signal components, especially signal components corresponding to possible external disturbances and/or classified as noise, and, insofar, also dominates at least within a frequency range corresponding to a bandwidth of the wanted mode.

The vibration measurement signals $s_1$, $s_2$, delivered by the measuring transducer and having, in each case, a signal component with a signal frequency corresponding an instantaneous oscillation frequency, $f_{exc}$, of the in at least two measuring tubes oscillating the actively excited, wanted mode, are, as also shown in FIG. 3, fed to the transmitter electronics TE and from there then to the therein provided measuring- and evaluating circuit µC, where, by means of a corresponding input circuit IC, they are first preprocessed, especially preamplified, filtered and digitized, in order then to be able to be suitably evaluated. As input circuit IC, as well as also as measuring- and evaluating circuit µC, can be applied, in such case, circuit technologies already applied and established in conventional Coriolis, mass flow measuring devices used for the purpose of converting the vibration signals, or for ascertaining mass flow rates and/or totaled mass flows, etc., for example, also such as disclosed in the initially mentioned state of the art. According to an additional embodiment of the invention, the measuring- and evaluating circuit µC is accordingly also implemented by means of a microcomputer provided in the transmitter electronics TE, for example, realized by means of a digital signal processor (DSP), and by means of program code correspondingly implemented and running therein. The program code can be stored e.g. in a non-volatile data memory EEPROM of the microcomputer persistently and be loaded, in the case of the starting of the same, into a volatile data memory RAM, e.g. one integrated in the microcomputer. Suitable processors for such applications are available, e.g. such as the type TMS320VC33 of the firm, Texas Instruments. Of course, the vibration signals $s_1$, $s_2$ are, as already indicated, to be converted by means of corresponding analog-to-digital converters A/D of the transmitter electronics TE into corresponding digital signals for processing in the microcomputer; compare, for this, for example, the initially mentioned U.S. Pat. No. 6,311,136 or U.S. Pat. No. 6,073,495, or also the aforementioned measurement transmitters of the series, "PROMASS 83".

The transmitter electronics TE, or the therein contained measuring- and evaluating circuit µC, serves, in such case, according to an additional embodiment of the invention, with application of the vibration measurement signals $s_1$, $s_2$ delivered by the sensor arrangement 50, for example, on the basis of a phase difference detected between the vibration signals $s_1$, $s_2$ of the first and second oscillation sensor 51, 52, generated in the case of measuring tube 10 oscillating partially in wanted- and Coriolis modes, recurringly to ascertain a mass flow-measured value $X_m$, which represents a mass flow rate of the medium flowing in the measuring transducer. For such purpose, the transmitter electronics produces, according to an additional embodiment of the invention, during operation, recurringly, a phase difference-measured value $X_{\Delta\phi}$, which represents, instantaneously, the phase difference, $\Delta\phi$, existing between the first vibration-signal $s_1$ and the second vibration-signal $s_2$. Alternatively, or in supplementation, for ascertaining the mass flow-measured value $X_m$, the transmitter electronics TE of the measuring system can also serve to produce, derived from an instantaneous oscillation frequency ascertained on the basis of the vibration measurement signals or the exciter signal, especially the frequency of the actively excited, wanted mode, a density-measured value, which represents a density of the medium flowing in the measuring transducer. Additionally, the transmitter electronics TE can, as quite usual in the case of in-line measuring devices of the type being discussed, in given cases, also be used to ascertain a viscosity-measured value $X_\eta$ representing a viscosity the in the measuring transducer flowing medium; compare, for this, also the initially mentioned U.S. Pat. No. 7,284,449, 7,017,424, 6,910,366, 6,840,109, 5,576,500 or U.S. Pat. No. 6,651,513. For ascertaining the exciter energy or excitation power, or damping, required for the determining the viscosity, suited, in such case, is, for example, the exciter signal delivered by the driver circuit of the transmitter electronics, especially an amplitude and frequency of its electrical current component driving the wanted mode or also an amplitude of the total exciter current normalized, in given cases, also on an oscillation amplitude ascertained on the basis of at least one of the vibration signals. Alternatively thereto or in supplementation thereof, however, also an internal control signal serving for tuning the driver signal, or the exciter current or, for example, in the case of an exciting of the vibrations of the at least one measuring tube with an exciter current of fixedly predetermined, or amplitude controlled to be constant, also at least one of the vibration signals, especially an amplitude of, can serve as a measure of the exciter energy or excitation power, or damping required for ascertaining the viscosity, measured value.

As already multiply mentioned, in the case of tube arrangements of the type being discussed, thus having at least two parallelly connected flow paths, there is an increased risk of an unrecognized, in given cases, also abrupt, partial plugging B, for example, as a result of solid bodies jammed in one of the measuring tubes. In the case of the measuring system of the invention, the transmitter electronics TE, consequently, serves, especially, to monitor the tube arrangement by means of measuring signals delivered by the measuring transducer, especially also in the case of medium flowing through the tube arrangement, for possible partial plugging B, especially monitoring based on the fact that a temperature difference existing between the first measuring tube and the second measuring tube is ascertained, and a partial plugging B (shown in FIG. 3, by way of example, in the inlet region of the second measuring tube) of the tube arrangement is correspondingly signaled, in case the ascertained temperature difference deviates from a predetermined limit value for the temperature difference representing a non plugged tube arrangement. For such purpose, the measuring transducer of the measuring system of the invention includes additionally, connected to the transmitter electronics, a temperature measuring arrangement having a first temperature sensor for producing a temperature signal $T_1$ dependent on a temperature $\theta_1$ of the first measuring tube and at least a second temperature sensor 62, for example a second temperature sensor 62 constructed equally to the first temperature sensor 61, for producing a temperature signal $T_2$ dependent on a temperature $\theta_2$ of the second measuring tube. Each of the temperature sensors, especially equally constructed temperature sensors, can be embodied, for example, as a resistance thermometer or also as a thermocouple. On the basis of the at least two temperature measurement signals delivered by the temperature measuring arrangement, the transmitter electronics ascertains whether the tube arrangement is partially plugged, then, for example, by comparison of both temperature signals, whether and to what extent these deviate from one another as a result of the plugging B of a the measuring tubes, and/or by comparison of each of the two temperature signals, whether or to what extent one of the two deviates, as a result of plugging B, from a predetermined reference temperature or a reference temperature measured during operation.

With application of the temperature signal produced by means of the first temperature sensor and the temperature signal produced by means of the second temperature sensor, the transmitter electronics can, finally, at least at times when a criterion corresponding to this state is fulfilled by the temperature signals, trigger an alarm $X_{Err}$, e.g. by the mentioned display- and operating element HMI on-site on the display and/or audibly by means of signal horn controlled by the measuring system, signaling a partial plugging of the tube arrangement. Therefore, according to an additional embodiment of the invention, it is provided, that the transmitter electronics, with application of the temperature signal produced by means of the first temperature sensor and the temperature signal produced by means of the second temperature sensor, generates the aforementioned alarm $X_{Err}$, when the temperature signal produced by means of the first temperature sensor and the temperature signal produced by means of the second temperature sensor deviate from one another over a limit value correspondingly predetermined therefor, as regards at least one signal parameter derived, in each case, therefrom, i.e. a signal parameter such as e.g. a time average value of a signal amplitude of each of the two temperature signals, a variation of a signal amplitude of each of the two temperature signals, a cross correlation of the two temperature signals, or the like. Alternatively, or in supplementation, the transmitter electronics can, however, also with application of a temperature-difference signal formed by means of the temperature signal produced by the first temperature sensor and by means of the temperature signal produced by the second temperature sensor, and representing, between the first measuring tube and the second measuring tube, a temperature difference signaling the aforementioned, partial plugging of the tube arrangement, generate alarm $X_{Err}$, when the temperature difference represented by the temperature-difference signal deviates from a predetermined limit value representing a non plugged tube arrangement. The limit value required, in each case, for generating the alarm $X_{Err}$ can be ascertained, for example, by experiments simulating undisturbed, or partially plugged tube arrangements performed earlier on the particular, correspondingly prepared measuring transducer or on corresponding or at least comparable tube arrangements with corresponding temperature measuring arrangements, and can be correspondingly stored in the associated transmitter electronics. For the case, in which the tube arrangement is formed by means of exactly two measuring tubes flowed through in parallel, the transmitter electronics, or the limit value, can, in advantageous manner, be so formed, that the therewith generated alarm $X_{Err}$ signals the plugging of only one of the two measuring tubes, or that the therewith generated alarm $X_{Err}$ signals that medium is flowing through one of the two measuring tubes—in the example shown in FIG. 3, the first measuring tube—, while, in the other the two measuring tubes—in the example illustrated in FIG. 3, thus, the second measuring tube—medium is no longer flowing. For the other mentioned case, in which the tube arrangement is formed by means of more than two—, for example, four-measuring tubes flowed through in parallel, the transmitter electronics can, in advantageous manner, be so embodied, that the alarm $X_{Err}$ signals, that at least one of the measuring tubes, as a result plugging, no longer has medium flowing through it, while medium is, however, still flowing through at least one of the measuring tubes.

In an additional embodiment of the invention, the temperature sensors for monitoring the tube arrangement are so placed in the measuring transducer, or the therewith provided temperature measuring arrangement is so embodied, that the temperature signal produced by means of the first temperature sensor depends predominantly on the temperature of the first measuring tube and the temperature signal produced by means of the second temperature sensor depends predominantly on the temperature of the second measuring tube and/or that the first temperature sensor reacts, for instance, equally as rapidly with a change of its temperature signal for a change of the temperature of the first measuring tube as does the second temperature sensor with a change of its temperature signal for a change of the temperature of the second measuring tube. In an additional embodiment of the invention, the first temperature sensor and the second temperature sensor are additionally so embodied and placed in the measuring transducer, that the temperature signal produced by means of the first temperature sensor is correlated more with the temperature, or the time temperature curve, of the first measuring tube than the temperature signal produced by means of the second temperature sensor, or that the temperature signal produced by means of the second temperature sensor is correlated more with the temperature, or the time temperature curve, of the second measuring tube than the temperature signal produced by means of the first temperature sensor.

For the purpose of producing temperature signals reacting as rapidly as possible to possible partial plugging of the tube arrangement, or correlated as strongly as possible with the, in each case, registered measuring tube temperatures, it can additionally also be quite advantageous to affix the first temperature sensor, as also schematically presented in FIG. 3, directly on the first measuring tube and the second temperature sensor directly on the second measuring tube, for instance, in each case, by means of thermally well conducting solder, or adhesive, bond. For minimizing the mounting- and wiring effort required for implementing the measuring system of the invention, according to an embodiment of the invention, it is additionally provided, that, except for the first temperature sensor, no further temperature sensor is affixed to the first measuring tube, or, that—alternatively or in supplementation—except for the second temperature sensor, no further temperature sensor is affixed to the second measuring tube; in case—, for instance, for reasons of increasing the reliability of detection of partial plugging of the tube arrangement or for the purpose of creation of redundance-required, the temperature measuring arrangement can, however, also be formed by means of two or more temperature sensors mutually spaced on each of the measuring tubes. For the purpose of additionally simplifying the mounting-, or wiring effort, it can additionally also be quite advantageous to place each of the two temperature sensors, as also schematically presented in FIG. 3, in each case, in the region of the first coupling zone #11. Alternatively thereto, at least one of the temperature sensors can, however, also be affixed on one of the two flow dividers. For example, the first temperature sensor can be affixed to the first flow divider somewhat nearer to its first flow opening than to the second flow opening of said flow divider, and/or the second temperature sensor can be affixed to the second flow divider somewhat nearer to its second flow opening than to the first flow opening of said flow divider.

For improving the accuracy, or information content, of the monitoring of the tube arrangement implemented by means of the transmitter electronics, especially also for preventing a false alarm, or for validation of the temperature measurement signals delivered by the temperature measuring arrangement, the temperature measuring arrangement includes, according to an additional embodiment of the invention, at least a third temperature sensor 63, for example, a third temperature sensor 63 directly affixed to the measuring transducer housing and/or, again, formed as a resistance thermometer, for producing a temperature signal $T_3$ dependent on a, temperature $\theta_3$ of the measuring transducer housing serving, for example, as a reference temperature for the monitoring implemented by means of the transmitter electronics. With application of the temperature signal produced by the first temperature sensor as well as the temperature signal produced by the third temperature sensor, the transmitter electronics can, for example, generate a report, which signals, that the temperature signals delivered by the temperature measuring arrangement for monitoring the tube arrangement for partial plugging are suitable, since a temperature of the medium in the measuring transducer deviates from a temperature of the measuring transducer housing, for instance, for the case, in which a temperature difference between measuring transducer housing and medium ascertained on the basis of the temperature signals amounts at least for a predetermined period of time of more than 5 min, on time average, to more than 5 Kelvin. Alternatively, or in supplementation, the transmitter electronics can, with application of the temperature signal produced by the first temperature sensor as well as the temperature signal produced by the third temperature sensor, however, also generate a report, which signals, that the temperature signals delivered by the temperature measuring arrangement for monitoring the tube arrangement for partial plugging are instantaneously not suitable, since a temperature of the medium in the measuring transducer does not deviate, or deviates only insufficiently, from a temperature of the measuring transducer housing, for instance, for the case, in which a temperature difference between measuring transducer housing and medium ascertained on the basis of the temperature signals amounts for a predetermined period of time of more than 5 min, on time average, to less than 5 Kelvin. For producing a temperature signal reacting as rapidly as possible to possible change of a temperature difference existing between the environment of the measuring transducer and the medium flowing through it, it can, in such case, be of advantage, to place the third temperature sensor near to one of the two flow dividers.

For the initially mentioned case, in which the measuring transducer has for conveying flowing medium four measuring tubes connected to the flow dividers for forming a tube arrangement with four flow paths connected for parallel flow,—alternatively or in supplementation, for measuring the a temperature of the measuring transducer housing—the temperature measuring arrangement for monitoring the tube arrangement can additionally have a third temperature sensor for producing a temperature signal dependent on a temperature of a third measuring tube of the measuring transducer and at least a fourth temperature sensor for producing a temperature signal dependent on a temperature of a fourth measuring tube of the measuring transducer. In such case, the third temperature sensor can be affixed directly on the third measuring tube and the fourth temperature sensor directly on the fourth measuring tube, for instance, in each case, in the region of the inlet-side coupling zone.

For improving the accuracy, or the information content, of the monitoring the tube arrangement implemented by means of the transmitter electronics, especially also for preventing false alarms incorrectly signaling a plugging of the tube arrangement, or for validation of the temperature measurement signals delivered by the temperature measuring arrangement, it is additionally provided, that the transmitter electronics generates the alarm signaling partial plugging of the tube arrangement also with application of at least one vibration measurement signal representing the oscillations of the measuring tubes and/or with application of the at least one exciter signal. Based on the recognition that, in the case of partial plugging of the tube arrangement, its oscillatory behavior, for example, the eigenfrequency of the actively excited, wanted mode, or also the actively excited, wanted mode as regards its oscillation form, significant changes—, for example, in such a manner that, as a result of then latent unbalance in the tube arrangement, supplementally to the opposite equal bending oscillations in the actively excited, wanted mode, also parallel oscillations of the measuring tubes are excited and, thus, an, in comparison to undisturbed operation, increased excitation power is required for maintaining the opposite equal bending oscillations—through simple comparison of signal parameters derived from the vibration-signal, or from the exciter signal, for example, a time average value of a signal amplitude, a variation of a signal amplitude, a signal frequency or the like, with therefor corresponding, predetermined, for example, experimentally determined, limit values, supplementally, information concerning possible plugging of the tube arrangement can be won and correspondingly taken into consideration in generating the alarm. In accordance therewith, the transmitter electronics generates the alarm signaling partial plugging of the tube arrangement according to an additional embodiment of the invention also with application of at least one vibration measurement signal representing oscillations of the measuring tubes and/or with application of the at least one exciter signal, in case said vibration measurement signal, or said exciter signal, deviates from a limit value correspondingly predetermined therefor as regards at least one signal parameter, in each case, derived therefrom, especially a time average value of a signal amplitude, a variation of a signal amplitude, a signal frequency or the like.

Through application of a temperature measuring arrangement of the aforementioned type, it is additionally possible, by means of the measuring system of the invention, to ascertain the temperature, 9, of the medium per se with a higher accuracy, or also a higher reliability, than, for example, with conventional measuring systems of the type being discussed having only a single temperature sensor registering the temperature of the respective medium, for example, according to the initially mentioned U.S. Pat. No. 4,768,384. Therefore, the transmitter electronics produces, according to an additional embodiment of the invention, with application both of the temperature signal produced by means of the first temperature sensor as well as also the temperature signal produced by means of the second temperature sensor —, in given cases, also with application of further temperature sensors possibly provided in the temperature measuring arrangement for registering measuring tube temperatures—at least at times, for example, only when the transmitter electronics detectes no partial plugging of the tube arrangement, a temperature-measured value $X_s$, which represents a temperature of the medium flowing in the tube arrangement.

The aforementioned calculational functions, especially also those, in each case, serving for producing the alarm $X_{ERR}$, or other of the aforementioned measured values, can be very simple implemented, e.g. by means of the above mentioned microcomputer of the evaluating-circuit µC or, for example, also a digital signal processor DSP correspondingly provided therein. The creation and implementing of corresponding algorithms, which correspond to the above-described formulas or, for example, also simulate the operation of the mentioned amplitude, or frequency, control circuits for the exciter mechanism, as well as their translation into program code correspondingly executable in the transmitter electronics, is known, per se, to those skilled in the art and needs, consequently, —, in any event, with knowledge of the present invention—no detailed explanation. Of course, the aforementioned formulas, or other functionalities of the measuring system implemented with the transmitter electronics, can also be implemented, wholly or partially, directly by means of corresponding, discretely constructed and/or hybrid, thus mixed analog-digital, calculational circuits in the transmitter electronics TE.

What is claimed:

1. A method for monitoring a tube arrangement formed by means of a first measuring tube and at least a second measuring tube connected therewith for parallel flow, said method comprises:

permitting flow of medium through the tube arrangement;

ascertaining a temperature difference existing between the first measuring tube and the second measuring tube; and signaling a partial plugging of the tube arrangement, when the ascertained temperature difference deviates from a predetermined limit value for the temperature difference representing a non-plugged tube arrangement.

2. A measuring system, for a medium flowing in a pipeline said measuring system comprises:

a measuring transducer through which the medium flows during operation for producing vibration signals corresponding with parameters of the flowing medium; and transmitter electronics electrically coupled with the measuring transducer for activating the measuring transducer and for evaluating measuring signals delivered by the measuring transducer, wherein said measuring transducer comprises:

an inlet-side, first flow divider including at least two mutually spaced, flow openings; an outlet-side, second flow divider including at least two mutually spaced, flow openings; at least two measuring tubes connected to the flow dividers for forming a tube arrangement including at least two flow paths connected for conveying flowing medium with parallel flow, of which two measuring tubes a first measuring tube opens with an inlet-side, first measuring tube end into a first flow opening of said first flow divider and with an outlet-side, second measuring tube end into a first flow opening of said second flow divider and a second measuring tube opens with an inlet-side, first measuring tube end into a second flow opening of said first flow divider and with an outlet-side, second measuring tube end into a second flow opening of said second flow divider; and a temperature measuring arrangement connected to the transmitter electronics, said temperature measuring arrangement including a first temperature sensor for producing a temperature signal dependent on a temperature of the first measuring tube, and said temperature measuring arrangement including a second temperature sensor for producing a temperature signal dependent on a temperature of the second measuring tube, wherein;

said transmitter electronics, with application of the temperature signal produced by means of said first temperature sensor and the temperature signal produced by means of said second temperature sensor generates, at least at times, an alarm signaling a partial plugging of the tube arrangement.

3. The measuring system as claimed in claim 2, wherein: said transmitter electronics, with application of the temperature signal produced by means of said first temperature sensor and the temperature signal produced by means of said second temperature sensor generates an alarm signaling a partial plugging of the tube arrangement, when the temperature signal produced by means of said first temperature sensor and the temperature signal produced by means of said second temperature sensor deviate from one another more than a limit value correspondingly predetermined therefor, as regards at least one signal parameter derived, in each case, therefrom.

4. The measuring system as claimed in claim 2, wherein: said transmitter electronics, with application of a temperature-difference signal formed by means of the temperature signal produced by said first temperature sensor and by means of the temperature signal produced by said second temperature sensor, and representing a temperature difference existing between said first measuring tube and said second measuring tube, generates an alarm signaling a partial plugging of the tube arrangement, when the temperature difference represented by the temperature-difference signal deviates from a limit value predetermined therefor, representing a non plugged tube arrangement.

5. The measuring system as claimed in claim 2, wherein: said first temperature sensor and said second temperature sensor are so embodied and placed in the measuring transducer, that said first temperature sensor reacts about equally rapidly with a change of its temperature signal for a change of the temperature of said first measuring tube as does said second temperature sensor with a change of its temperature signal for a change of its temperature of said second measuring tube.

6. The measuring system as claimed in claim 2, wherein: said first temperature sensor and said second temperature sensor are so embodied and placed in the measuring transducer, that the temperature signal produced by means of said first temperature sensor is predominantly dependent on the temperature of said first measuring tube and the temperature signal produced by means of said second temperature sensor is predominantly dependent on the temperature of said second measuring tube.

7. The measuring system as claimed in claim 2, wherein: said first temperature sensor and said second temperature sensor are so embodied and placed in the measuring transducer, that the temperature signal produced by means of said first temperature sensor is correlated more with the temperature of said first measuring tube than is the temperature signal produced by means of said second temperature sensor.

8. The measuring system as claimed in claim 2, wherein: said first temperature sensor and said second temperature sensor are so embodied and placed in the measuring transducer, that the temperature signal produced by means of said second temperature sensor is correlated more with the temperature of said second measuring tube than is the temperature signal produced by means of said first temperature sensor.

9. The measuring system as claimed in claim 2, wherein: said first temperature sensor is affixed to said first measuring tube; and/or said second temperature sensor is affixed to said second measuring tube.

10. The measuring system as claimed in claim 1, wherein except for said first temperature sensor, no other temperature sensor is affixed to said first measuring tube; and/or wherein except for said second temperature sensor, no other temperature sensor is affixed to said second measuring tube.

11. The measuring system as claimed in claim 2, wherein: said transmitter electronics, with application of the temperature signal produced by means of said first temperature sensor and the temperature signal produced by means of said second temperature sensor produces, at least at times, a temperature-measured value, which represents a temperature of the medium flowing in the tube arrangement.

12. The measuring system as claimed in claim 2, wherein: said measuring transducer includes four measuring tubes connected to said flow dividers for forming a tube arrangement with four flow paths for conveying flowing medium with parallel flow.

13. The measuring system as claimed in claim 12, wherein: the temperature measuring arrangement includes: a third temperature sensor for producing a temperature signal dependent on a temperature of a third measuring tube of said measuring transducer and at least a fourth temperature sensor for producing a temperature signal dependent on a temperature of a fourth measuring tube of said measuring transducer.

14. The measuring system as claimed in claim 2, wherein: said measuring transducer further comprises: a measuring transducer housing with an inlet-side, first housing end, and with an outlet-side, second housing end.

15. The measuring system as claimed in claim 14, wherein: the temperature measuring arrangement includes at least a third temperature sensor for producing a temperature signal dependent on a temperature of said measuring transducer housing.

16. The measuring system as claimed in claim 15, wherein: said transmitter electronics, with application of the temperature signal produced by said first temperature sensor and with application of the temperature signal produced by said third temperature sensor, generates a report, which signals that the temperature signals delivered by the temperature measuring arrangement are suitable for monitoring the tube arrangement for partial plugging, since a temperature of the medium in said measuring transducer deviates from a temperature of said measuring transducer housing.

17. The measuring system as claimed in claim 15, wherein: said transmitter electronics, with application of the temperature signal produced by said first temperature sensor the temperature signal produced by said third temperature sensor, generates a report, which signals that the temperature signals delivered by the temperature measuring arrangement are not instantaneously suitable for monitoring the tube arrangement for partial plugging, since a temperature of the medium in said measuring transducer does not deviate, or deviates only insufficiently, from a temperature of said measuring transducer housing.

18. The measuring system as claimed in claim 2, wherein: said measuring transducer further comprises: at least one electromechanical oscillation exciter for exciting and/or maintaining vibrations of the at least two measuring tubes about, in each case, an imaginary oscillation axis imaginarily connecting an inlet-side, first measuring tube end of the respective measuring tube and an outlet-side, second measuring tube end of the respective measuring tube, with a natural resonance frequency of said measuring transducer.

19. The measuring system as claimed in claim 2, wherein: said measuring transducer further comprises: a first oscillation sensor first oscillation sensor, for registering inlet-side vibrations of the at least two measuring tubes and for producing a first vibration signal of the measuring transducer representing vibrations at least of one of the measuring tubes; and a second oscillation sensor second oscillation sensor, for registering outlet-side vibrations of the at least two measuring tubes and for producing a second vibration signal of said measuring transducer representing vibrations at least of one of the measuring tubes.

20. The measuring system as claimed in claim 19, wherein: said transmitter electronics generates the alarm signaling partial plugging of the tube arrangement with application of at least one of the vibration signals, when said vibration signal deviates from a limit value correspondingly predetermined therefor, as regards at least one signal parameter derived, in each case, from said vibration signal.

21. The measuring system as claimed in claim 19, wherein said transmitter electronics, by means of the first vibration signal and by means of the second vibration signal, generated a phase difference, measured value, which represents existing between the first vibration-signal and the second vibration-signal; and/or
wherein said transmitter electronics, by means of the first vibration signal and by means of the second vibration signal, generates a mass flow-measured value, which represents a mass flow rate, of medium flowing in said measuring transducer.

22. The method as claimed in claim 1, wherein signaling a partial plugging of the tube arrangement including at least one of: signaling a plugging of exactly one of the measuring tubes and signaling a plugging of the first measuring tube, in the case of simultaneously non-plugged second measuring tube.

23. The measuring system as claimed in claim 2,
wherein the first temperature sensor is affixed directly to the first measuring tube; and/or
wherein the second temperature sensor is affixed directly to the second measuring tube.

24. The measuring system as claimed in claim 2, wherein at least one of said first and second temperature sensors is formed as a resistance thermometer.

25. The measuring system as claimed in claim 2, wherein the alarm, generated by the transmitter electronics, signals a plugging of exactly one of the measuring tubes.

26. The measuring system as claimed in claim 2, wherein the alarm, generated by the transmitter electronics, signals a plugging of the first measuring tube, in the case of simultaneously non-plugged, second measuring tube.

27. The measuring system as claimed in claim 2, wherein: said transmitter electronics, with application of the temperature signal produced by means of said first temperature sensor and the temperature signal produced by means of said second temperature sensor generates an alarm signaling a partial plugging of the tube arrangement, when the temperature signal produced by means of said first temperature sensor and the temperature signal produced by means of said second temperature sensor deviate from one another more than a limit value correspondingly predetermined therefor, as regards at least one signal parameter derived from said temperature signals and selected of: a time average value of a signal amplitude of each of the two temperature signals, a variation of a signal amplitude of each of the two temperature signals, and a cross correlation of the two temperature signals.

28. The measuring system as claimed in claim 2, wherein: said transmitter electronics, with application of the temperature signal produced by means of said first temperature sensor and the temperature signal produced by means of said second temperature sensor produces, at least at times and when said transmitter electronics detects no partial plugging of the tube arrangement, a temperature-measured value, which represents a temperature of the medium flowing in the tube arrangement.

29. The measuring system as claimed in claim 15, wherein: the third temperature sensor is affixed directly to said measuring transducer housing.

30. The measuring system as claimed in claim 15, wherein: the third temperature sensor is formed as a resistance thermometer.

31. The measuring system as claimed in claim 20, wherein: said at least one signal parameter derived, in each case, from said vibration signal is selected from: a time average value of a signal amplitude, a variation of a signal amplitude, a signal frequency.

* * * * *